(12) United States Patent
Masui

(10) Patent No.: US 7,301,870 B2
(45) Date of Patent: Nov. 27, 2007

(54) INFORMATION RECORDING METHOD AND AN INFORMATION RECORDING APPARATUS

(75) Inventor: Naruhiro Masui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 552 days.

(21) Appl. No.: 10/937,285

(22) Filed: Sep. 10, 2004

(65) Prior Publication Data

US 2005/0030863 A1    Feb. 10, 2005

Related U.S. Application Data

(63) Continuation of application No. PCT/JP2004/002806, filed on Mar. 5, 2004.

(30) Foreign Application Priority Data

Jun. 13, 2003    (JP)    ............................. 2003-168616

(51) Int. Cl.
G11B 7/00    (2006.01)

(52) U.S. Cl. ................................ 369/47.53; 369/59.11; 369/116; 369/47.52

(58) Field of Classification Search .............. 369/47.53
See application file for complete search history.

(56) References Cited

U.S. PATENT DOCUMENTS 5,732,062 A    3/1998    Yokoi et al.
5,815,477 A *  9/1998    Kimura et al. ........... 369/47.53
6,101,159 A    8/2000    Shoji et al.
6,256,277 B1   7/2001    Saga et al.

FOREIGN PATENT DOCUMENTS

| JP | 6-44567 | 2/1994 |
| JP | 9-134525 | 5/1997 |
| JP | 11-175976 | 7/1999 |
| JP | 2000-231719 | 8/2000 |
| JP | 2002-319130 | 10/2002 |

* cited by examiner

*Primary Examiner*—William R. Korzuch
*Assistant Examiner*—Jorge L. Ortiz-Criado
(74) *Attorney, Agent, or Firm*—Dickstein Shapiro LLP

(57) ABSTRACT

An information recording method where different optimum recording power levels are determined for different mark lengths.

At a first trial writing process, first predetermined test data, from which a specific pattern, e.g., 3T is removed, are written with recording power levels being shifted, and a first optimum recording power level is determined based on a reproduction signal of the recorded first test data. Then, at a second trial writing process, second predetermined test data that are constituted by 3T marks are written with the recording power level for the 3T marks being shifted, and with the recording power level for marks other than the 3T marks being set at the first optimum recording level, and a second optimum recording power level for the 3T marks is determined based on a reproduction signal of the recorded second test data.

16 Claims, 10 Drawing Sheets

US 7,301,870 B2

INFORMATION RECORDING METHOD AND AN INFORMATION RECORDING APPARATUS

CROSS-REFERENCE TO RELATED APPLICATION

This application is a U.S. continuation application filed under 35 USC 111(a) claiming benefit under 35 USC 120 and 365(c) of PCT application JP2004/002806, filed Mar. 5, 2004, which claims priority to Application Ser. No. 2003-168616, filed in Japan on Jun. 13, 2003. The foregoing applications are hereby incorporated herein by reference.

TECHNICAL FIELD

The present invention relates to an information recording method and an information recording apparatus for various recording media, such as CD-R, CD-RW, DVD-R, DVD-RW, DVD-RAM, and DVD+RW.

BACKGROUND TECHNOLOGY

Recently and continuing, optical disk drive apparatuses such as CD-R drives are put to practical use, and research for enlarging storage capacity at higher speeds is being conducted. As rewritable disks, a write-once optical disk using a coloring-matter (dye) system medium, a recordable opto-magnetic medium, a recordable phase-change medium, and the like are in use.

Generally, an optical disk recording apparatus uses a semiconductor laser as the luminous source, a laser beam from which is pulse-modulated by information to be recorded, and is irradiated to a recording medium such that a recording mark is formed. At this time, the formation state of the recording mark varies with the power of the laser beam to record. For this reason, prior to starting recording the information to be recorded, a trial writing is performed to a predetermined area (PCA: Power Calibration Area, i.e., trial writing area) at various recording power levels, and a power level that provides the best reproduction signal is selected as the optimum recording power level. This process is called OPC (Optimum Power Control). Then, information recording is carried out using the optimum recording power level.

There are several criteria for evaluating the quality of such reproduction signal, i.e., for determining which signal is the best. A couple of typical criteria are described as follows.

A first criterion is characterized by evaluating such reproduction signal based on the asymmetry $\beta$ of the reproduction signal (often called "the $\beta$ method"). According to the $\beta$ method, with reference to FIG. 3, a positive side peak value A (=Ipk−Idc) and a negative side peak value B (=Idc−Ibt) in reference to a DC level Idc of the reproduction signal are detected.

Then, $\beta$ is obtained according to a formula $\beta=\{(Ipk-Idc)-(Idc-Ibt)\}/(Ipk-Ibt)$, and a reproduction signal, $\beta$ value of which meets a predetermined value, for example, zero, is determined to be the best reproduction signal.

A second criterion is characterized by using a modulation index m of a reproduction signal (often called "the $\gamma$ method"). According to the $\gamma$ method, a peak (the maximum) value Ipk and a bottom (the minimum) value Ibt of the reproduction signal are detected as shown in FIG. 3.

Then, the modulation index m is calculated according to a formula $m=(Ipk-Ibt)/Ipk$. Then, a change rate $\gamma$, which is a rate of change of m to change of recording power P, is calculated according to a formula $\gamma=(\Delta m/\Delta P)\times(P/m)$. A recording power level Pt that makes $\gamma$ to be equal to a predetermined value $\gamma t$ is obtained. Then, the optimum power level is obtained by multiplying Pt and a predetermined constant k.

Nevertheless, a mark edge recording method is often used with optical disks, such as CD and DVD. According to the mark edge recording method that is suitable for high-density recording, the length of a mark carries information. According to this method, exact control of the form and the edge position of the mark is required in order to correctly reproduce data. Further, a multi-pulse recording method is often used, wherein each recording mark is formed by two or more recording pulses such that the shape of the recording marks is made uniform even if the lengths of the marks differ. That is, heating and cooling cycles are repeated, and a uniform long mark is formed by connecting marks corresponding to the pulses. This method is applied also to the coloring-matter system write-once type media.

Furthermore, various recording methods are proposed in response to demands for higher-speed and larger-capacity recording. One of such proposals uses multiple recording power levels. The multiple power level recording method is conceived for compensating for certain characteristic differences of a mark having a certain length from other marks having different lengths. For example, relations between the recording power Pw and a gap $\Delta$ from a predetermined ideal value of a recording mark having a certain length are different from the relations of other recording marks having different lengths depending on relations between the recording medium and recording pulse shape. FIG. 5 shows an example. In FIG. 5, (1) represents properties of a mark having a length equivalent to 3T, and (2) represents properties of other mark lengths. Here, T represents the reference clock cycle of data. As for CD, mark lengths range from 3T to 11T, and the gap $\Delta$ from the predetermined ideal value due to variation of the recording power as for a 3T mark is different from other marks having different lengths. In view of this, 3T marks are recorded at a power level different from other marks having other lengths such that all marks are correctly recorded according to the multiple power level recording method. In the example shown in FIG. 5, the 3T mark is recorded at the recording power Pwex, and other marks are recorded at the recording power Pw.

Conventionally, in the multiple power level recording method, when trial writing is carried out for OPC, power levels are varied such that the recording power Pwex of the specific mark length (e.g., 3T) is defined as proportional to the recording power Pw (i.e., Pwex/Pw=constant), or alternatively, the difference between Pwex and Pw is kept constant (i.e., Pwex−Pw=constant). Then, the optimum power is determined.

However, the OPC performed in this manner poses a problem due to the fact that the relations between the recording power and the gap from the predetermined ideal value vary with mark lengths. Further, when there are variations from recording medium to recording medium, and from recording apparatus to recording apparatus (namely, variation of the record pulse shapes by the variations of semiconductor laser drive units), the relations between the optimum values of the recording power for the specific mark length Pwex(opt) and the recording power for other marks Pw(opt) also vary. For this reason, it becomes impossible to obtain proper recording power levels Pwex(opt) and Pw(opt), accuracy of the mark form and the mark position is spoiled, and as a result, a problem arises in that a data error occurs.

DISCLOSURE OF THE INVENTION

The present invention aims at offering an information recording method and an information recording apparatus wherein optimum recording power levels are calculated for different marks having different lengths such that accurate information recording is provided.

In order to attain the above-mentioned object, the information recording method according to the present invention that is for recording information by forming recording marks by irradiating a light from a luminous source, the light being modulated by recording information, to a recording medium is characterized by, among other things, providing a first trial writing process wherein first test data are written on a predetermined trial writing area of the recording medium with the recording power being varied step by step, and a first optimum recording power level is determined based on reproduction signals of the first test data recorded as above. Further, the present invention provides a second trial writing process wherein second test data are written on a predetermined trial writing area of the recording medium with the recording power being varied step by step for a specific pattern of the recording information, with the first optimum recording power level being applied to other patterns of the recording information, and a second optimum recording power level being determined based on reproduction signals of the second test data. In this manner, the first and the second optimum recording power levels are obtained.

As described above, the optimum recording power level for the specific pattern of the recording information, and the optimum recording power level for other patterns are separately obtained. Such power levels are used in information recording, and in this manner, all marks having different lengths can be formed with a sufficient precision, and accurate recording can be obtained.

According to another feature of the information recording method of the present invention, the specific pattern is removed from the above-mentioned first predetermined test data. In this manner, the first optimum power level can be more accurately obtained without being influenced by the specific pattern that has different characteristics.

According to another feature of the information recording method of the present invention, the above-mentioned second predetermined test data consist of a repetition of a first data stream that consists of a repetition of the specific pattern, and a second data stream that is constituted by the data of the recording information from which the specific pattern is removed.

In this manner, average values of the reproduction signals of each data stream are separately obtained, and the optimum power levels for the specific pattern and other patterns are easily and accurately obtained.

According to another feature of the information recording method of the present invention, the first optimum recording power level of the first trial writing process is computed from the modulation index, or the change rate of the modulation index of the reproduction signal obtained from the area on which the first trial writing is carried out, and the second optimum recording power level of the second trial writing process is computed from the asymmetry of the reproduction signal obtained from the area to which the second trial writing is carried out.

In the present invention and the description thereof, the asymmetry means the rate of the positive side peak value to the negative side peak value, the peak values being measured in reference to the average level of the reproduction signal.

In this manner, each optimum recording power level can be obtained with a sufficient precision based on each test data set.

According to another feature of the information recording method of the present invention, the first optimum recording power level in the first trial writing process is computed from the asymmetry of the signal obtained by reproducing the first test data that are written in the first trial writing area, and the second optimum recording power level in the second trial writing process is computed from the asymmetry of the signal obtained by reproducing the second test data that are written in the second trial writing area.

In this manner, each optimum recording power level is obtained with a sufficient precision based on each test data set.

According to another feature of the information recording method of the present invention, the second optimum recording power level in the second trial writing process is computed from the average of the reproduction signals of the first data stream in the area on which the second trial writing is carried out, and the average of the reproduction signals of the second data stream in the area on which the second trial writing is carried out.

In this manner, each optimum recording power level is obtained with a sufficient precision based on each test data set.

According to another feature of the information recording method of the present invention, the above-mentioned specific pattern is constituted by marks, the length of which marks is no longer than other marks (the shortest marks) contained in the above-mentioned recording information.

In this manner, the specific pattern is defined as being constituted by the shortest marks, and the optimum recording power is calculated separately from the optimum recording power of other marks having other lengths. Accordingly, this method can be simply and suitably applied to various recording media.

According to another feature of the information recording method of the present invention, the above-mentioned specific pattern is defined by a record mark length, and one or both of a pattern immediately before a recording information sequence, and a pattern immediately after thereof.

In this manner, even if a recording medium requires that the optimum recording power level of the specific pattern be different from the optimum recording power level of other patterns, recording marks can be formed with a sufficient precision, and accurate recording can be performed.

According to another feature of the information recording method of the present invention, the recording marks are divided into N groups (N being a natural number, 2 or greater) by mark lengths, and the optimum recording power levels are computed for each of the groups. Accordingly, a trial writing process is provided to each of the groups. Specifically, test data for the Mth group (M being a natural number from 1 to N) are written to a predetermined trial writing area of the recording medium with the recording power level being varied, and the optimum recording power level for the Mth group is ascertained by evaluating a signal obtained when reproducing the recorded Mth data set. This is repeated for all the N groups.

In this manner, the optimum recording power level is computed for each group having a predetermined mark length. Accordingly, even if a recording medium requires different optimum power levels for different mark lengths, all mark lengths can be recorded with a sufficient precision, and accurate recording can be performed.

According to another feature of the information recording method of the present invention, N is set at 3, wherein the third group is constituted by marks having the shortest mark length of the recording information, the second group is constituted by marks having the next shortest mark length, and the first group is constituted by marks having other mark lengths.

This feature is well applied to a recording medium where different recording power levels are needed for different mark lengths, which is often the case when high-speed recording is carried out.

According to another feature of the information recording method of the present invention, N is set at 3, wherein the third group is constituted by marks having the shortest mark length of the recording information, the second group is constituted by marks having mark lengths that are equal to an even number of times of the reference cycle of the recording information, and the first group is constituted by marks having mark lengths that are equal to an odd number of times of the reference cycle of the recording information, except for the marks belonging to the third group.

This feature is well applied to a recording medium where different recording power levels are required for 3T marks, even numbers×T marks, and odd numbers×T marks, except for 3T marks, such as in the 2T strategy that has been used for high-speed CD and DVD recording.

The present invention further provides an information recording apparatus that implements the information recording methods described above.

EMBODIMENTS

Figure 1:
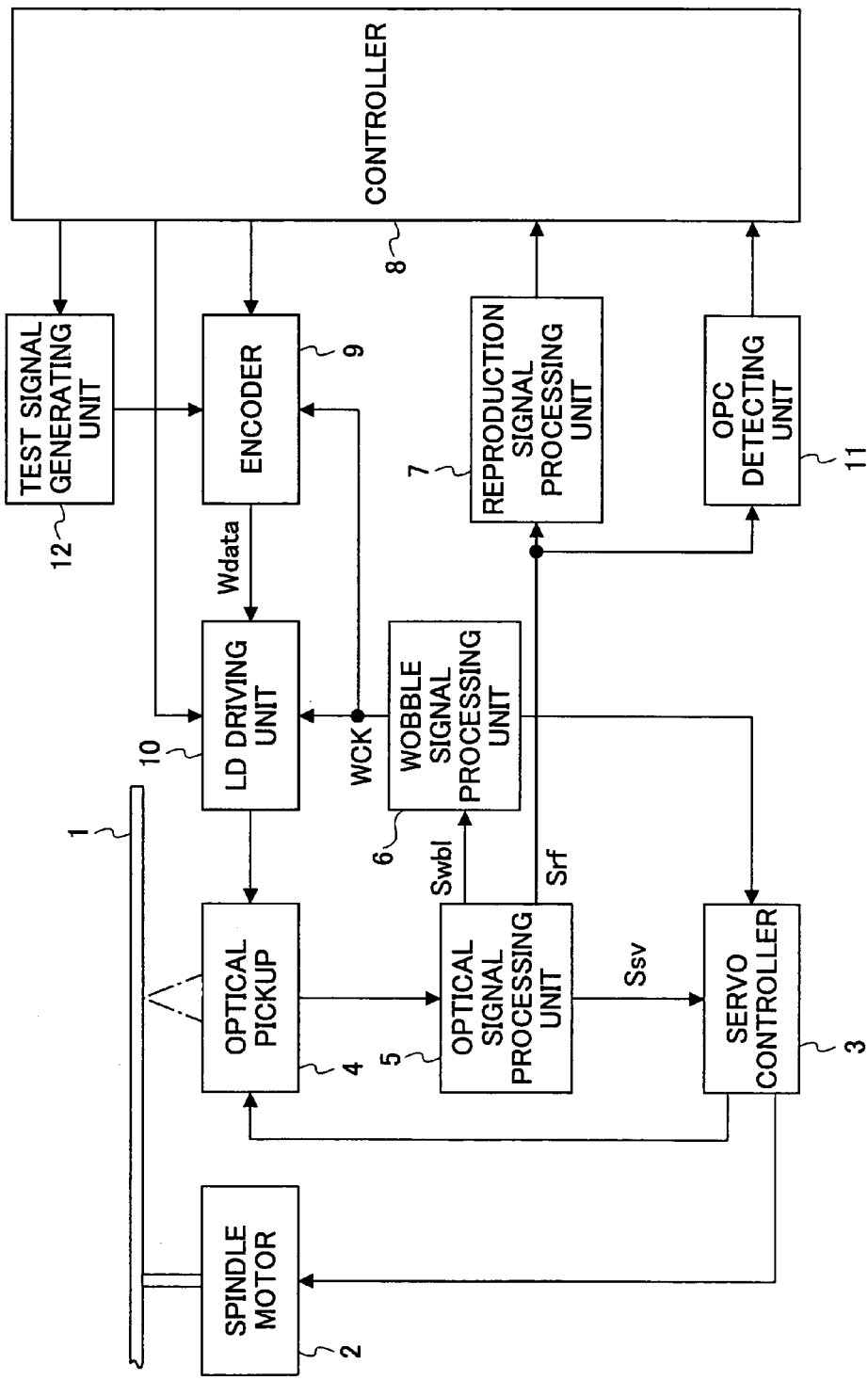
FIG. 1 is a block diagram showing an example of the outline configuration of an optical information recording apparatus according to an embodiment of the present invention.

Embodiments of the present invention are described using attached drawings. FIG. 1 is a block diagram showing an example of the outline configuration of an optical information recording apparatus that includes an information recording apparatus of the present invention.

A recording medium 1 used in the optical information recording apparatus is a recordable medium such as an optical disk, such as CD-R, CD-RW, DVD-R, DVD-RW, DVD+R, DVD+RW, DVD-RAM, MD, MO, and the like. A spindle motor 2 rotates the recording medium 1, and a servo controller 3 provides a control signal such that the spindle motor 2 rotates at a constant linear velocity (CLV) or a constant angular velocity (CAV). An optical pickup (PU) 4 irradiates an optical beam from a semiconductor laser (LD) for recording information in the recording medium 1, and receives a reflected beam from the recording medium 1 and converts the reflected beam into a receiving signal. The optical PU 4 includes a luminous source, an optical receiving unit for receiving the reflected light and for converting it into the receiving signal, an optical system, and an actuator. Further, the optical pickup 4 includes an optical monitoring unit for receiving and monitoring a part of the irradiated optical beam from the luminous source, and variations in the irradiated optical beam from the luminous source are monitored and controlled by a monitor signal that is output by the optical monitoring unit. Further, the optical PU 4 can include a tilt detecting unit for detecting an inclination (tilt) of the irradiated optical beam relative to the recording medium 1.

The optical signals received by these units (i.e., the optical receiving unit, the optical monitoring unit, and the tilt detecting unit) of the optical pickup 4 are input to an optical signal processing unit 5, which performs various processes on the received optical signals. Further, the optical signal processing unit 5 generates a reproduction signal Srf from the received optical signals, and, jointly with the servo controller 3, controls the actuator such that the optical beam is always irradiated within a predetermined tolerance against tilt and fluctuations in the radius direction of a track accompanying the rotation of the recording medium 1 (a focal servo control and track servo control). For this purpose, a servo error signal Ssv is generated from the received optical signals, and provided to the servo controller 3. Further, the optical pickup 4 moves in the radius direction of the recording medium 1 such that a seek operation is carried out for irradiating the optical beam to a desired position. The servo controller 3 performs the seek operation control, a rotation control, and a tilt control of the recording medium 1 based on address information and the like beforehand recorded on the recording medium 1.

In the recording medium 1, a wobble is beforehand formed. The wobble is a recording track that goes in a zigzag at a predetermined frequency. The optical signal processing unit 5 extracts a wobble component from the wobble, and generates a wobble signal Swbl. Then, a wobble signal processing unit 6 generates a recording clock (writing clock) WCK based on the wobble signal Swbl. The recording clock WCK serves as the reference clock for the rotation control, address information detection, and recording.

A reproduction signal processing unit 7 demodulates the reproduction signal Srf according to a predetermined modulation technique of the recording medium 1. Further, a built-in PLL circuit extracts a reproduction clock. The demodulated data are supplied to a controller 8.

An encoder 9 modulates the recording information (information to be recorded) supplied from the controller 8 according to a predetermined modulation technique, and outputs the recording data Wdata. The recording data Wdata are generated on the basis of the recording clock WCK. For example, in a DVD recording apparatus, the EFM+ modulation technique is used, and pulse lengths of the recording data Wdata are 3T through 11T, and 14T (here, T represents the cycle of the recording clock WCK).

An LD drive unit 10 modulates the luminous source LD with a predetermined optical waveform according to the recording data Wdata and the recording clock WCK. The controller 8 sets up irradiation power, optical waveform information, etc. Further, the monitor signal is input from the optical signal processing unit 5, and the power of the optical beam irradiated from the luminous source LD is controlled at a desired level based on this monitor signal (the so-called Automatic Power Control APC is performed).

Figure 2:
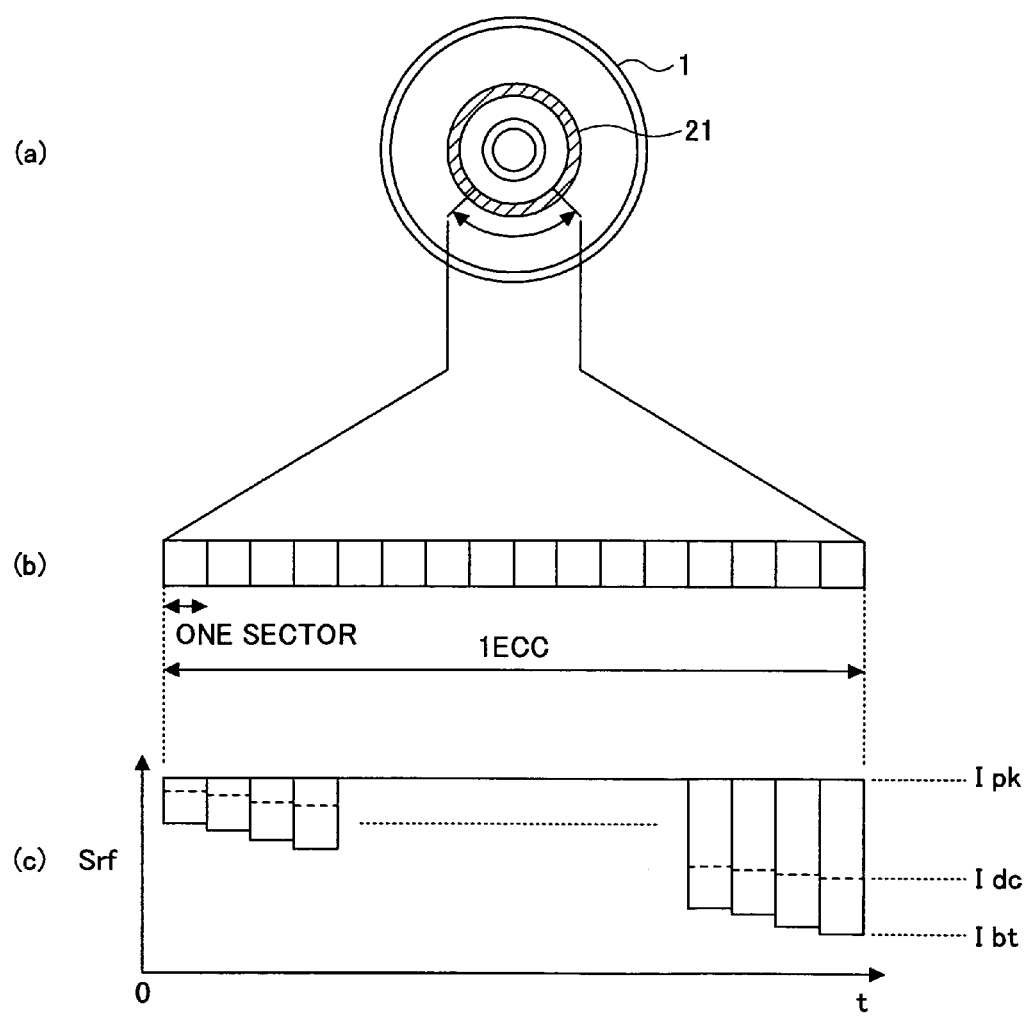
FIG. 2 is a schematic drawing showing a trial writing method.

Here, trial writing is performed on a predetermined area PCA 21 (Power Calibration Area, a trial writing area prepared at, for example, the innermost tracks) of the recording medium 1 as shown at (a) of FIG. 2. Prior to starting actual data recording, trial writing is carried out on the PCA, and the optimum recording power levels are obtained, i.e., OPC (Optimum Power Control) is performed. Further, as shown at (b) of FIG. 2, a sequence of trial writing is performed using a 1 ECC block, which is constituted by 16 sectors, 1 ECC serving as the minimum unit for information recording. Trial writing is performed with the recording power levels changing every sector.

Figure 3:
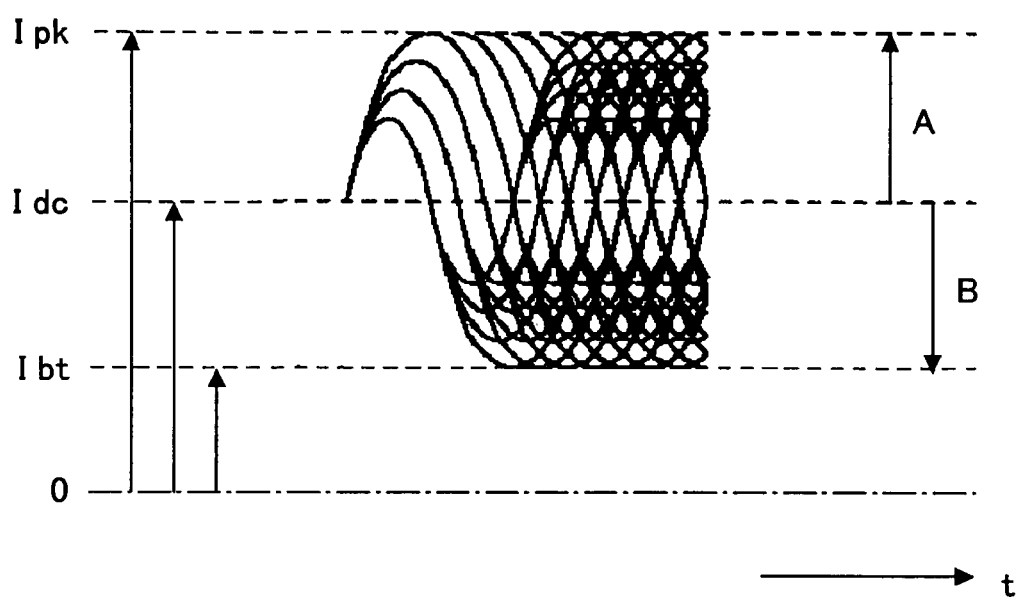
FIG. 3 is a graph showing an eye diagram of a reproduction signal.

Then, the reproduction signal Srf of each sector of the PCA is obtained as shown at (c) of FIG. 2. Then, an OPC detecting unit 11 detects the maximum value Ipk, the minimum value Ibt, and the average (DC value) Idc of each sector of the reproduction signal Srf. FIG. 3 shows an example of the eye diagram of the reproduction signal Srf. The controller 8 reproduces data in the PCA on which trial writing is performed, obtains these values, carries out a predetermined operation using these values, and obtains the optimum recording power level. Details of the predetermined calculation operation are described below.

A test signal generating unit 12 generates data for trial writing, the data being also called a test pattern. The encoder 9 receives the test pattern, selects a part of the test pattern, and provides the selected part of the test pattern to the LD drive unit 10.

The controller 8 is for controlling the entirety of the apparatus, including exchanging recording information and reproduced information with the host computer (not shown), and communicating commands in addition to carrying out functions described above and a control process as described below.

Figure 4:
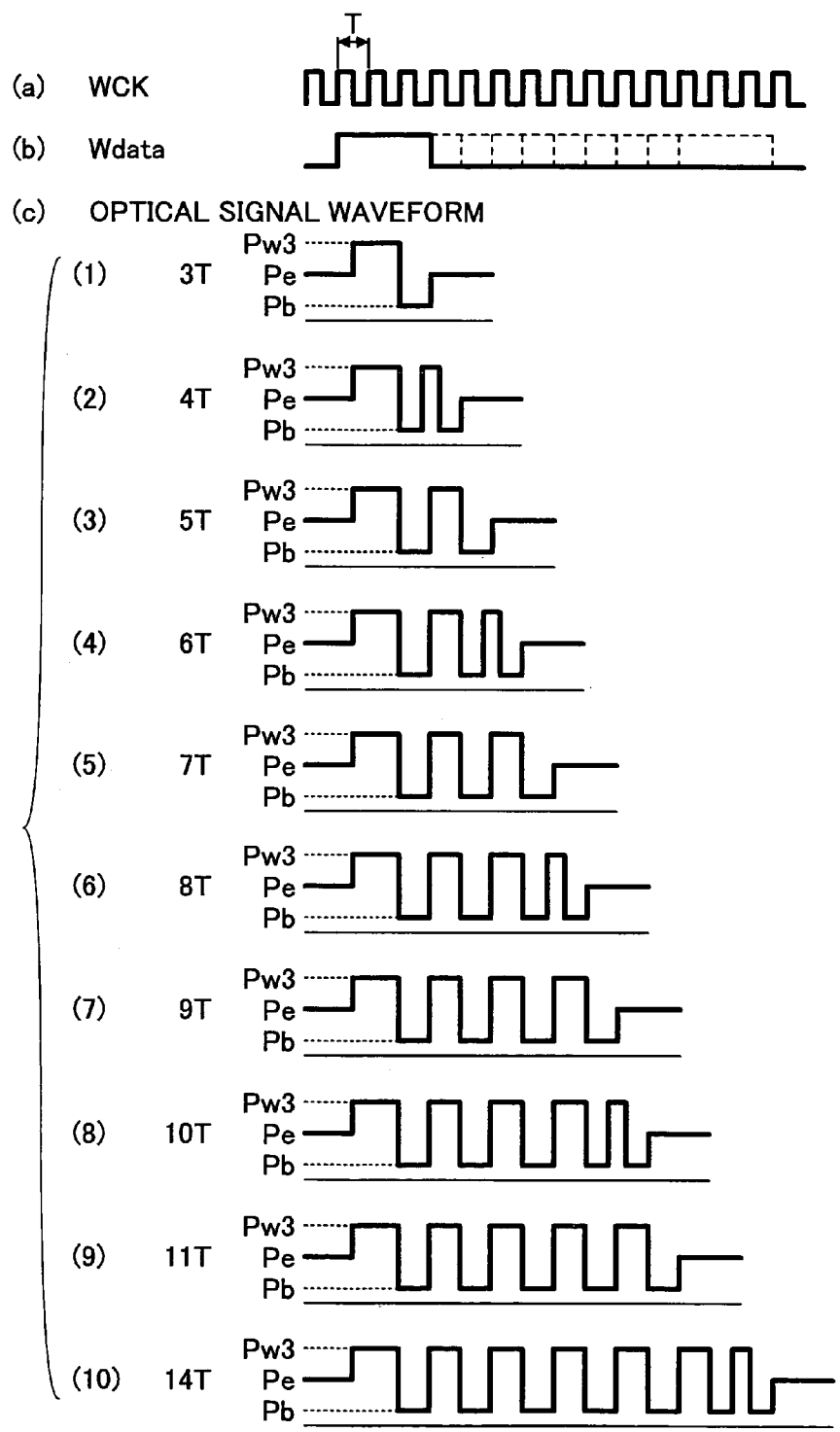
FIG. 4 is a waveform chart showing an example of an optical waveform for different mark lengths of recording information.

FIG. 4 shows an example of the optical waveform from the luminous source LD in the case that a phase-change type recording medium (rewritable recording medium), such as DVD-RW, is used as the recording medium 1. At (a) of FIG. 4, the recording clock WCK is shown. At (b) of FIG. 4, the recording data Wdata are shown. At (c) of FIG. 4, the optical waveforms corresponding to mark lengths 3T through 11T, and 14T (may be simply expressed as "3T through 14T") are shown at (1) through (9), and (10), respectively. Further, irradiation power levels are expressed by Pb for the bottom power, Pe for the erasing power, and Pw for the writing (recording) power. Here, the writing power levels for 3T through 14T marks may be referred to as Pw3 through Pw14, respectively. Nevertheless, FIG. 4 shows the case wherein all the writing power levels, Pw3 through Pw14 are made equal, and Pw3 is assigned to all the writing power levels.

Figure 5:
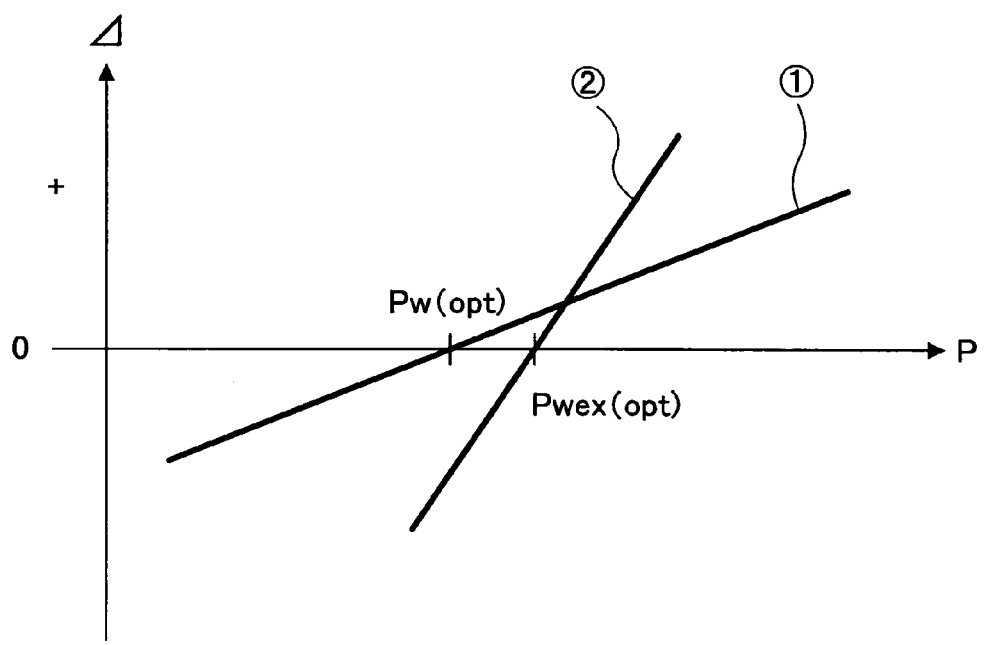
FIG. 5 is a graph showing relations between gaps from an ideal value and recording power levels for different mark lengths.

Further, the number of pulses is made the same for 4T and 5T; the number of pulses is made the same for 6T and 7T; the number of pulses is made the same for 8T and 9T; and the number of pulses is made the same for 10T and 11T, which is the 2T strategy method. While all the writing power levels Pw3 through Pw14 are made equal in this example, there are cases wherein the relations between the gap Δ from the ideal length of a mark and the recording power level may be different from mark length to mark length depending on recording waveforms, kinds of the recording medium 1, and so on. (Further, since recording properties can also change by different recording speeds, the same recording medium may not be properly recorded at speeds different from a preset speed.) FIG. 5 shows the relations between the gap Δ from the ideal length of a mark and the recording power level. The line (2) represents the relations of the 3T mark length, and the line (1) represents the relations of other mark lengths. To a recording medium having the characteristics as above, all mark lengths can be formed with a sufficient precision if Pw3 is set at Pwex(opt), and all the remaining power levels Pw4 through Pw14 are set at Pw(opt).

Figure 6:
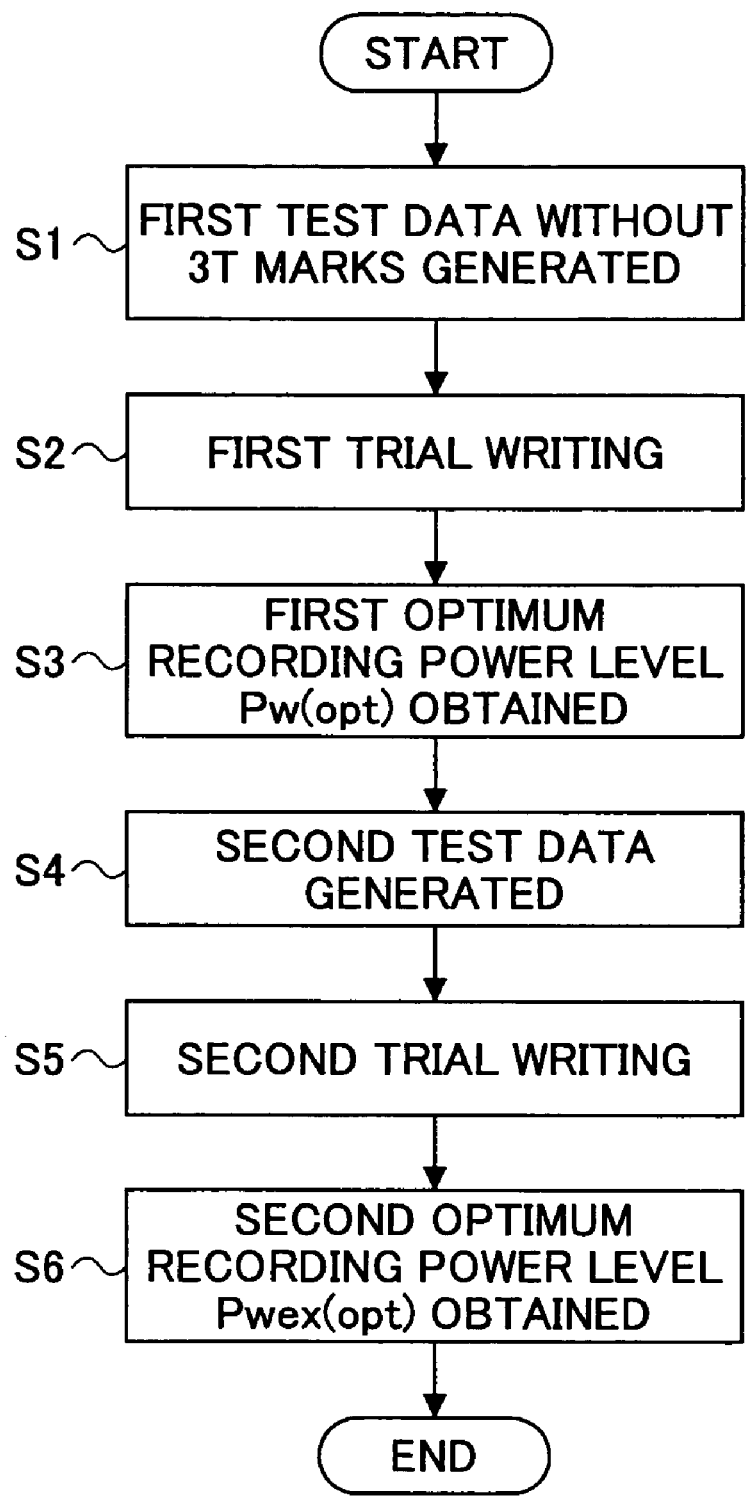
FIG. 6 is an outline flowchart showing an example of trial writing control.

FIG. 6 is a flowchart showing an example of a process of the recording method under situations like this for the recording medium 1, the process being performed by the controller 8 that is based on a microcomputer. FIG. 6 shows the algorithm for calculating the optimum recording power levels Pw(opt) and Pwex(opt) in the trial writing process. Calculation of the optimum recording power levels is performed prior to recording actual data. First trial writing means perform a first trial writing process for computing the optimum recording power Pw(opt), and second trial writing means perform a second trial writing process for computing the optimum recording power Pwex(opt).

When the first trial writing means perform the first trial writing process, a first test pattern to be used at the first trial writing process is generated (Step S1). The first test pattern is constituted by data patterns of the recording information from which a specific pattern is removed, the specific pattern being the shortest marks having the 3T length according to the present embodiment. Further, the predetermined modulation rule is fulfilled. At the first trial writing process, the first test pattern serving as the recording data Wdata is supplied from the encoder 9.

Next, the recording power Pw (each of Pw4 through Pw14,) is applied with its power level being shifted for every sector, and the first test pattern is written to the trial writing area (Step S2 of the first trial writing process).

At Step S3, the first test pattern written at Step S2 is reproduced, and a power level that is used for writing a sector that provides the best reproduction signal Srf is determined to be the optimum recording power Pw(opt).

As for evaluating the quality of the reproduction signal, i.e., as for determining which is the best reproduction signal, criteria that follow are used.

According to the first of such criteria, as explained with reference to FIG. 3, the maximum value Ipk, the minimum value Ibt, and the average value (DC value) Idc of the reproduction signal Srf of each sector are detected. Then, the following formula is applied to each sector, and the asymmetry value β is obtained.

$$\beta = \{(Ipk - Idc) - (Idc - Ibt)\}/(Ipk - Ibt) \quad (1)$$

Usually, the best reproduction signal is obtained when β=0, and accordingly, a recording power level of a sector that provides a value nearest to 0 is determined to be the optimum recording power Pw(opt). Alternatively, an approximation formula expressing relations between the recording power Pw and the asymmetry value β may be generated, and a recording power level that provides β=0 may be made the optimum recording power Pw(opt).

Figure 7:
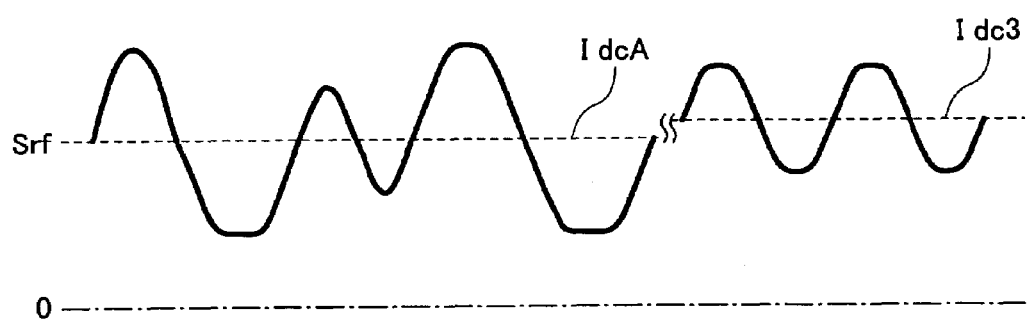
FIG. 7 is a graph showing properties of a reproduction signal obtained from a trial writing area.

As described above, the first test pattern does not contain 3T marks. If the 3T marks are included in the first test pattern, the optimum recording power Pw(opt) cannot be correctly obtained. This is because the optimum recording power Pwex(opt) of 3T marks differs from the optimum recording power Pw(opt) of other marks (as shown by FIG. 5). For this reason, the reproduction signal Srf obtained from the area recorded by the optimum recording power of the marks other than the 3T marks becomes as shown in FIG. 7. That is, the average IdcA for the marks other than the 3T marks is different from the average Idc3 for the 3T marks (for example, the 3T marks are a pattern repeating 3T). The average of IdcA should be used to calculate the asymmetry value β. Including the Idc3 portion in the averaging calculation leads to an erroneous average, an erroneous β, and an erroneous optimum power level. According to the present embodiment, since the first test pattern does not contain the 3T marks in the first trial writing process, the errors such as described above are not generated, and the optimum recording power (for marks other than 3T marks) is correctly obtained.

The second of the criteria is based on an index that is a rate γ of a change in a modulation index m of a reproduction signal to a change in the recording power Pw. Here, the maximum value Ipk and the minimum value Ibt are detected based on the reproduction signal Srf of each sector like in the first criterion, and m is obtained by using the following formula (2).

$$m=(Ipk-Ibt)/Ipk \quad (2)$$

Then, the rate γ is calculated according to the following formula (3).

$$\gamma=(\Delta m/\Delta Pw)\times(Pw/m) \quad (3)$$

Then, a recording power level Pt that makes the rate γ of change match a predetermined value γt is obtained. Then, the optimum recording power level Pw is obtained by multiplying Pt by a predetermined coefficient k. These predetermined values γt and k are beforehand defined for all kinds of recording media 1 and recording apparatuses.

The optimum recording power level Pw(opt) can be calculated using the following second order approximation formula.

$$m=a\times Pw^2+b\times Pw+c \quad (4)$$

Here, a, b, and c are constants, which are determined based on plural sets of data about the modulation index m and the recording power Pw that are obtained by reproducing the data in the trial writing area.

As the approximation formula, a polynomial approximation higher than the second approximation reasonably meets measured values.

From the formulas (3) and (4) above, Δm/ΔPw=2×a×Pw+b is obtained. Accordingly, the following formula (5) is obtained.

$$Pw=\{-b(\gamma-1)\pm SQRT[b^2(\gamma-1)^2-4a(\gamma-2)c\gamma]\}/2a(\gamma-2) \quad (5)$$

Through calculations as above, the optimum recording power Pw(opt) is obtained by taking a positive solution Pw+ of the formula (5).

Further, the methods for obtaining the optimum recording power Pw(opt) may be combined. Further, a jitter detecting unit can be prepared, and a recording power level that provides the smallest jitter may be determined to be the optimum recording power Pw(opt).

Next, the second trial writing means perform the second trial writing process through Steps S4 through S6.

At Step S4, a second test pattern to be used at the second trial writing process is generated. As the second test pattern, a data pattern that contains all mark lengths can be used as the recording data Wdata. That is, Wdata here are target data to be recorded (for example, any data or predetermined data supplied from the controller 8) modulated by the encoder 9.

At Step S5, the second test pattern is written on the trial writing area with the recording power Pw (Pw4 through Pw14,) being set at the optimum recording power Pw(opt) obtained at Step S3, and changing the second recording power level Pwex (=Pw3) for every sector. At this time, if the recording medium 1 is a rewritable medium, the second test pattern may overwrite the first test pattern that has been written at Step S2, or alternatively, the first test pattern may be first erased, and the second test pattern may then be written. Further alternatively, the trial writing area (for example, 1 ECC block) that can be used by an operation may be divided into two halves, such that the first trial writing process uses the first half of the area, and the second trial writing process uses the second half of the area.

At Step S6, the data recorded at Step S5 are reproduced, and a power level used for recording a sector that provides the best reproduction signal Srf is determined to be the second optimum recording power Pwex(opt).

In order to evaluate the quality of the reproduction signal, like the case of Step S3, the maximum value Ipk, the minimum value Ibt, and the average value (DC value) Idc of the reproduction signal Srf in each sector are detected, and asymmetry β is computed according to the formula (1). Then, a recording power level that provides the smallest asymmetry β is determined to be the optimum recording power Pwex(opt). Alternatively, an approximate expression concerning the recording power Pwex and asymmetry β may be obtained, and a recording power level that provides β=0 may be determined to be the optimum recording power Pwex(opt).

In the second trial writing process, since the recording power of the marks other than the 3T marks is already optimized by the first trial writing process, the average IdcA except for the 3T marks provides β=0. At Step 5, since recording is performed with the recording power Pwex for the 3T marks changing, the average Idc3 of the 3T marks changes accordingly. In this manner, a sector, Idc3 of which fulfils Ipk−Idc3=Idc3−Ibt provides the asymmetry β=0, and the recording power level Pwex at which the sector is recorded is determined to be the optimum value Pwex(opt).

As described above, the optimum recording power levels Pw(opt) and Pwex(opt) are separately obtained, and the trial writing process is ended. By using the optimum recording power levels Pw(opt) and Pwex(opt) obtained as above, recording of actual data is carried out with a sufficient precision, and accurate recording is obtained.

Figure 8:
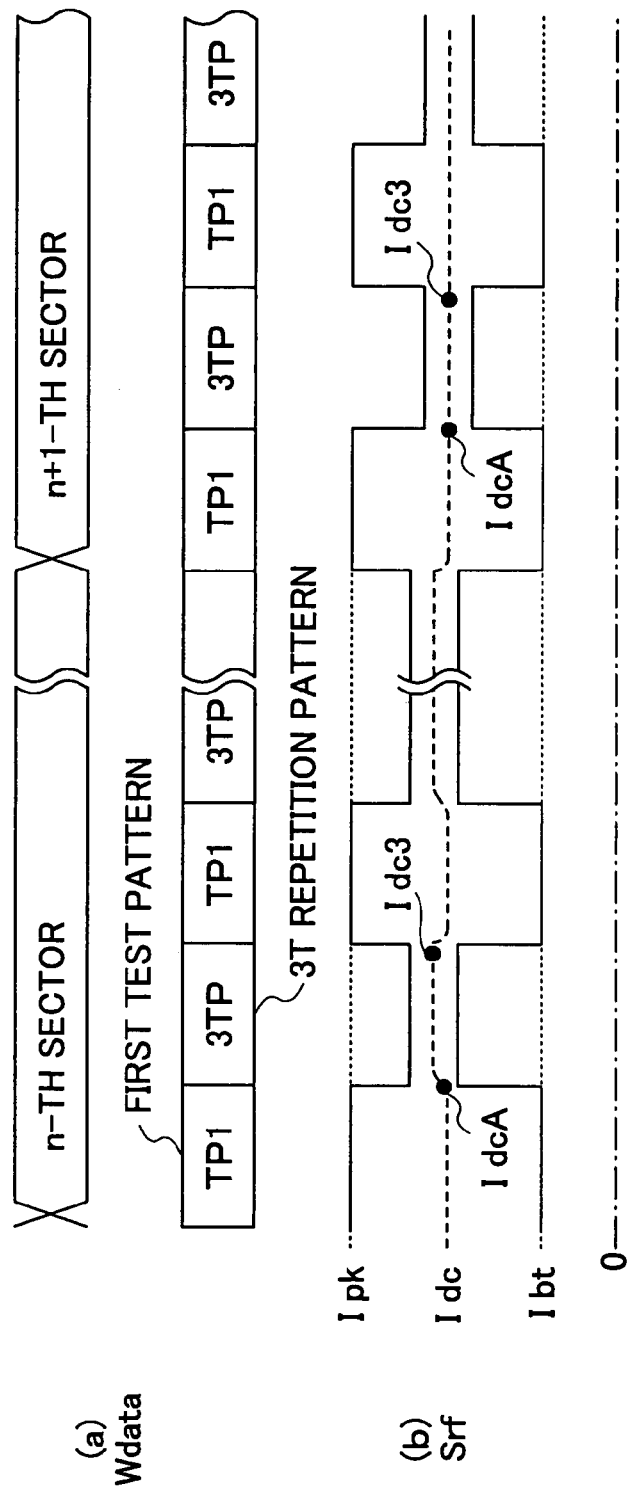
FIG. 8 is a diagram showing a second test pattern according to another embodiment of the present invention.

Next, another embodiment concerning the second test pattern used at the second trial writing process is described with reference to FIG. 8. Specifically, the second test pattern here is constituted by a repetition of a first data stream (repetition pattern of 3T, namely, 3TP), and a second data stream (the first test pattern, namely, TP1) that does not contain 3T marks, wherein the first data stream and the second data stream are alternately arranged. Then, the reproduction signal Srf and the average value Idc become as shown at (b) of FIG. 8, and the average Idc3 of the 3T marks and the average IdcA for marks other than 3T marks can be easily separated. Thus, the asymmetry β is obtained with a sufficient precision, and accordingly, precision of the optimum recording power levels also improves. Alternatively, since the asymmetry β becomes 0 for all the mark lengths if IdcA is equal to Idc3 in a sector, the recording power of such sector can be made the optimum recording power Pwex (opt).

Since the first test pattern TP1 and the 3T repetition pattern 3TP are repeated in sync with sectors at a predetermined cycle when the trial writing process is carried out, the average values IdcA and Idc3 can be easily detected if the averages are detected in sync with the sectors at the time of reproduction. Here, the repetition cycle of the first test pattern TP1 and the 3T repetition pattern 3TP is set up in consideration of the average detection bandwidth of the reproduction signal.

Further, when computing the optimum recording power based on the rate of change γ of the modulation index m in Step S3, since the modulation index m and its rate γ of change are hardly influenced even if a 3T mark is recorded with a recording power level different from the optimum recording power level, the first test pattern TP1 may contain all the mark lengths. In other words, ordinary data may serve as TP1. Then, the trial writing process may be carried out with Pw3 being made equal to the recording power Pw, and changed in concert with the recording power Pw.

Further, although the descriptions above are made assuming that the recording medium 1 is a phase-change type recording medium, the OPC method of the embodiments of the present invention as described above is also suitably applicable to a recording method for other types of recording media, wherein different recording power levels are used for 3T marks and other marks.

Figure 9:
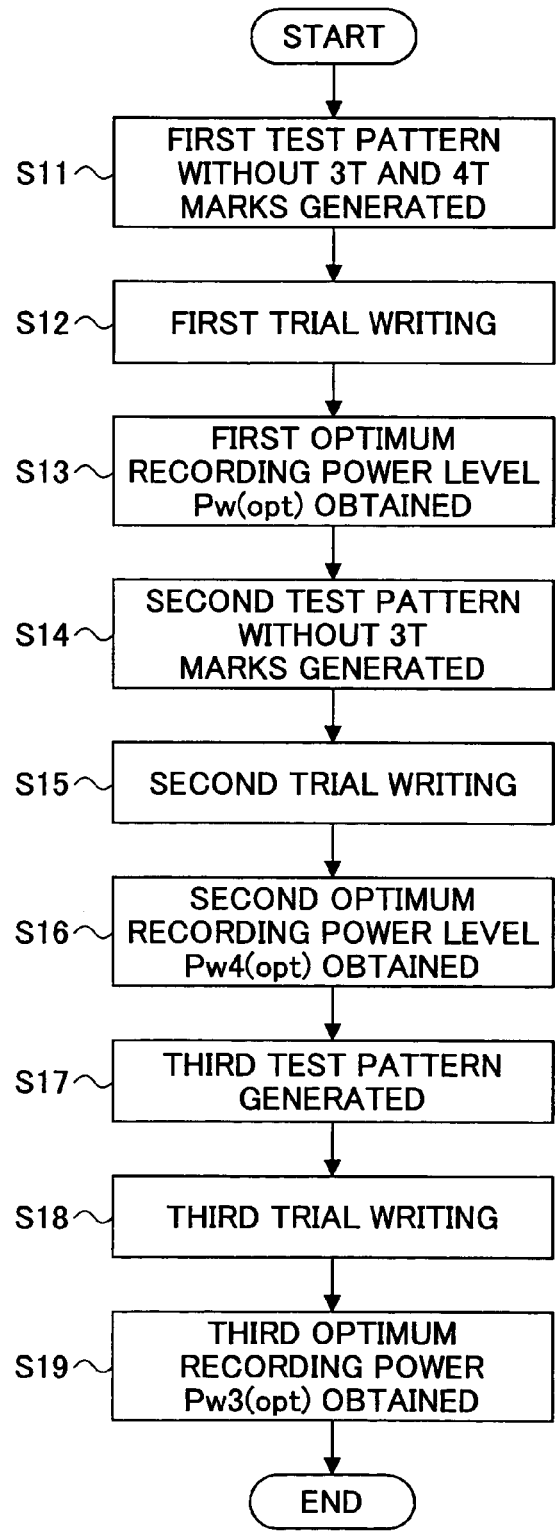
FIG. 9 is an outline flowchart showing an example of trial writing control according to another embodiment of the present invention, wherein different recording power levels are used for different mark lengths.

Next, an example of variation of the embodiments of the present invention is described with reference to a flowchart in FIG. 9, wherein the recording method uses multiple recording power levels depending on mark lengths. According to the variation, a recording power level Pw3 is used for 3T marks, a recording power level Pw4 is used for 4T marks, and a recording power level Pw is used for other marks, i.e., Pw=Pw5= through =Pw14. These power levels are obtained in the same manner as described above.

At Step S11, the first test pattern to be used at the first trial writing process is generated. The first test pattern is constituted by information to be recorded (recording information) from which 3T marks and 4T marks are excluded, and a predetermined modulation rule is fulfilled. At the first trial writing process, the encoder 9 supplies the first test pattern as the recording data Wdata.

At Step S12, the first test pattern is written on the trial writing area with the recording power Pw=Pw5= through =Pw14 being shifted for every sector.

At Step S13, the first test pattern written at Step S12 is reproduced, and a power level that records a sector providing the best reproduction signal Srf is determined to be the optimum recording power level Pw(opt). As for evaluating the quality of the reproduction signal, the criteria as described above are applicable.

At Step S14, the second test pattern to be used at the second trial writing process is generated. The second test pattern is constituted by the recording information except for 3T marks, and the predetermined modulation rule is fulfilled.

At Step S15, the recording power Pw (=Pw5=Pw6=-- =Pw14,) is set at Pw(opt) obtained at Step S13, and the second test pattern is recorded on the trial writing area at a recording power Pw4 that is shifted for every sector.

At Step S16, the second test pattern recorded at Step S15 is reproduced, and a power level that has recorded a sector providing the best reproduction signal Srf is determined to be the optimum recording power Pw4(opt). The criteria for determining the best reproduction signal Srf are the same as those of Step S6. Further, the second test pattern may consist of alternate repetition of the first test pattern and 4T repetition patterns like the case shown in FIG. 8.

At Step S17, a third test pattern to be used at a third trial writing process is generated. The third test pattern can be served by the recording information containing all mark lengths (for example, any data or predetermined data provided by the controller 8) modulated by the encoder 9.

At Step S18, the third test pattern is written on the trial writing area with the recording power Pw=Pw5= through =Pw14,) being set at the optimum recording power Pw(opt) computed at Step S13, the recording power Pw4 being set at the optimum recording power Pw4(opt) computed at Step S16, and the recording power Pw3 being shifted for every sector.

At Step S19, the third test pattern is reproduced from the trial writing area to which the third test pattern has been written at Step S18. Then, a power level that has recorded a sector that provides the best reproduction signal Srf is determined to be the optimum recording power Pw3(opt) in the same manner as Step S16.

That is, the variation described above is an example of a more generally defined method wherein the recording information is divided into N groups, N being a natural number, 2 or greater, the Mth test pattern (M being a natural number 1 through N) is written on the predetermined trial writing area of the recording medium 1 with the recording power level for the Mth group being shifted, the optimum recording power level is obtained by determining a writing power level that provides the best reproduction signal Sfr for the Mth group, and this process is repeated for all the N groups. Thus, the preceding variation is the case where N=3, the third group is constituted by 3T marks, the second group is constituted by 4T marks, and the first group is constituted by other marks.

In this manner, the optimum recording power levels Pw3 (opt), Pw4 (opt), and Pw(opt) are obtained, and the trial writing process is ended. The optimum recording power levels are used for recording actual data, i.e., the recording information, and all marks having different lengths can be formed with a sufficient precision, and accurate recording is obtained.

In addition, an alternative method is that the third test pattern is constituted by a data pattern excepting 4T marks, the second trial writing and third trial writing are performed continuously, the optimum recording power levels Pw4(opt) and Pw3(opt) are obtained by reproducing these two trial writing areas, and determining power levels that provide the best reproduction signals. In other words, Steps S11, S12, S13, S14, S15, S17, S18, S17, and S19 are performed in this sequence. In this manner, the trial writing process can be finished in a shorter time, since a process for switching between recording and reproducing can be eliminated, and the access time to the trial writing area and the like can be eliminated.

Figure 10:
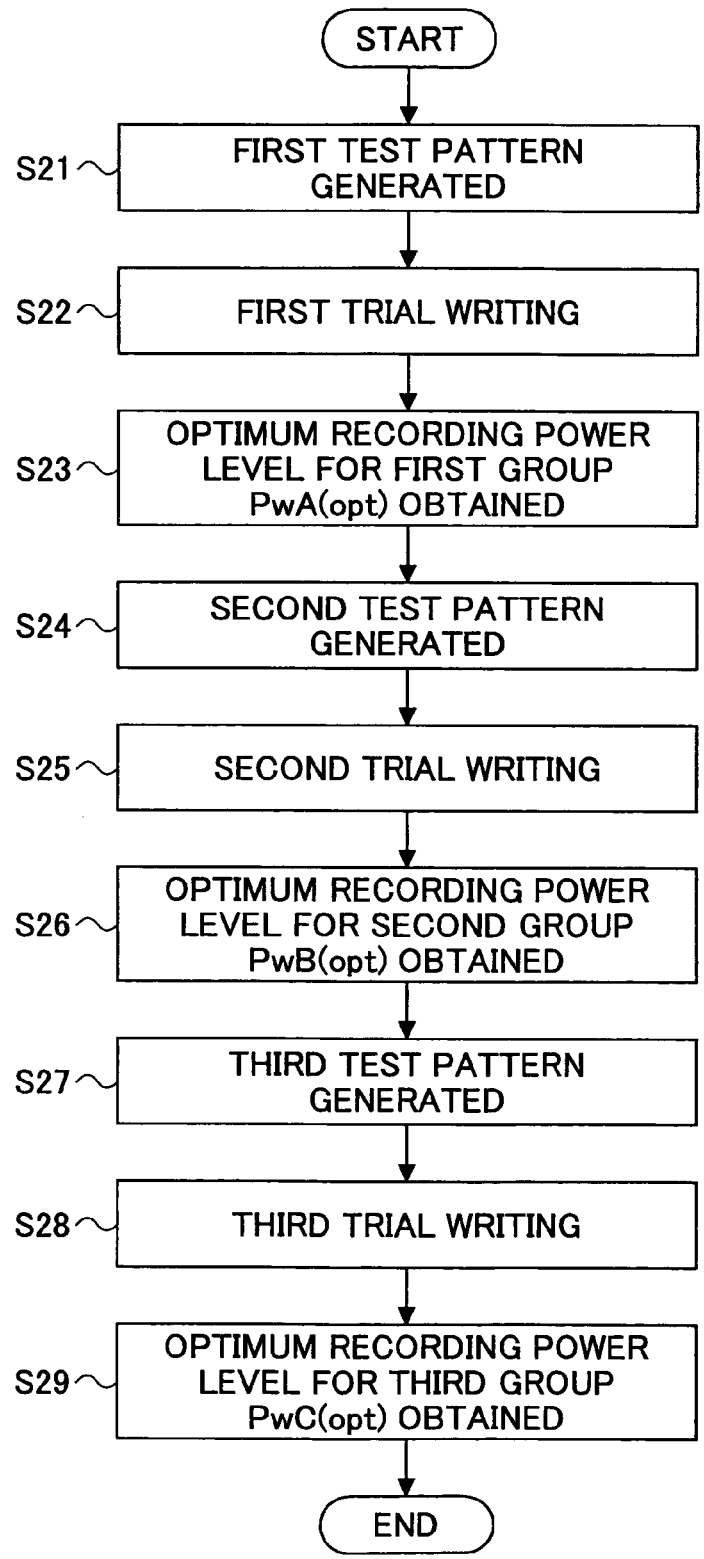
FIG. 10 is an outline flowchart showing an example of trial writing control according to another embodiment of the present invention, wherein different recording power levels are used for different mark lengths.

Next, another embodiment of the recording method is explained with reference to a flowchart shown by FIG. 10, wherein multiple recording power levels are used depending on mark lengths. According to the present embodiment, the recording data are divided into three groups, and the optimum recording power level is obtained for each of the groups. Specifically, the first group is constituted by marks having lengths equivalent to an even number of times of the reference cycle T (i.e., 4T, 6T, 8T, 10T, and 14T), the recording power level of which is expressed by PwA (=Pw4=Pw6=Pw8=Pw10=Pw14, respectively). The second group is constituted by marks having lengths equivalent to an odd number of times of the reference cycle T excepting 3T marks (i.e., 5T, 7T, 9T, and 11T), the recording power level of which is expressed by PwB (=Pw5=Pw7=Pw9=Pw11, respectively). The third group is constituted by 3T marks, the recording power of which is expressed by PwC (=Pw3). The first through the third trial writing processes are carried out while shifting the recording power levels PwA, PwB, and PwC, as applicable, and the corresponding optimum writing power levels are obtained as described in detail as follows.

The first test pattern is generated at Step S21. The first test pattern is constituted by data patterns that consist of mark lengths of the first group.

At Step S22, trial writing of the first test pattern is carried out on the trial writing area with the recording power PwA being shifted every sector.

At Step S23, the first test pattern that is recorded at Step S22 is reproduced, and a power level of a sector that provides the best reproduction signal Srf is determined to be the optimum recording power PwA(opt). For evaluating the quality of the reproduction signal Srf, the same criteria as described above are used.

The second test pattern is generated at Step S24. The second test pattern is constituted by data patterns that consist of mark lengths of the second group, or alternatively, mark lengths of the first group and the second group.

At Step S25, the second test pattern is written on the trial writing area with the recording power PwB being shifted every sector. In the case that the second test pattern includes marks having the lengths of the first group, the optimum recording power PwA(opt) obtained at Step S23 is beforehand set up.

At Step S26, the second test pattern that is recorded at Step S25 is reproduced, and a power level of a sector that provides the best reproduction signal Srf is determined to be the optimum recording power PwB(opt). For evaluating the quality of this reproduction signal, the same criteria as described above are used.

The third test pattern is generated at Step S27. This third test pattern is constituted by data patterns including all mark lengths.

At Step S28, the optimum recording power PwA(opt) obtained at Step S23 is set as the recording power PwA of the first group, the optimum recording power PwB(opt) obtained at Step S26 is set as the recording power PwB of the second group, and the third test pattern is written on the trial writing area with the recording power PwC being shifted every sector.

At Step S29, the third test pattern recorded at Step S28 is reproduced, and a power level of a sector that provides the best reproduction signal Srf is determined to be the optimum recording power PwC(opt) obtained, using the evaluation criteria as described at Step S6.

That is, the embodiment described above is an example of a more generally defined method wherein the recording information is divided into N groups, N being a natural number, 2 or greater, the Mth test pattern (M being a natural number 1 through N) is written to the predetermined trial writing area of the recording medium 1 with the recording power level for the Mth group being shifted, the optimum recording power level is obtained by determining a writing power level that provides the best reproduction signal Sfr for the Mth group, and this process is repeated for all the N groups. Thus, when the embodiment is the case where N=3, the third group is constituted by 3T marks, the second group is constituted by odd numbered×T marks except for 3T marks, and the first group is constituted by even numbered×T marks.

Thus, the optimum recording power levels PwA(opt), PwB(opt), and PwC(opt) are obtained, and the trial writing process is ended. The optimum recording power levels are used when recording actual data, and all marks having different lengths can be formed with a sufficient precision, and accurate recording is obtained.

In addition, although the embodiments are described with the specific pattern, for which a different recording power level is used, consisting of marks having a predetermined mark length (for example, the 3T marks), the specific pattern can be defined in other ways. The specific pattern can be defined by a combination of data patterns of the recording data Wdata (patterns based on one or both of a pattern immediately before the recording information sequence, and a pattern immediately after thereof; and a recording mark length). For example, the specific pattern, the recording power of which is differentiated from others, can be defined as a 3T mark that immediately follows a space equal to or longer than 6T. Then, the trial writing as described in reference to FIG. 6 is carried out so that the optimum writing power levels Pw(opt) and Pwex(opt) are obtained.

What is claimed is:

1. An information recording method for recording information by irradiating an optical beam from a luminous source to a recording medium, and forming recording marks, said optical beam being modulated by recording information, comprising:
   a first trial writing step for writing first predetermined test data on a trial writing area of said recording medium, wherein recording power of said optical beam is gradually changed, and for determining a first optimum recording power level based on a reproduction signal of said first predetermined test data;
   a second trial writing step for writing second predetermined test data on said trial writing area of said recording medium, wherein recording power of said optical beam for recording a specific pattern is gradually changed while said recording power for patterns other than said specific pattern is set at said first optimum recording power level, and for determining a second optimum recording power level, which is the optimum recording power level for said specific pattern, based on a reproduction signal of said second predetermined test data; and
   a step of writing said recording information at said second optimum recording power level for said specific pattern and at said first optimum recording power level for patterns other than said specific pattern.

2. The information recording method as claimed in claim 1, wherein said first predetermined test data comprise a data stream of said recording information, from which said specific pattern is excluded.

3. The information recording method as claimed in claim 2, wherein said second predetermined test data comprise a repetition of a first data stream and a second data stream, wherein
   said first data stream comprises a repetition of said specific pattern; and
   said second data stream comprises a data stream of said recording information, from which data stream of said specific pattern is excluded.

4. The information recording method as claimed in claim 1, wherein
said first optimum recording power level is determined based on one of a modulation index, and a rate of change of said modulation index of said reproduction signal obtained from said trial writing area to which said first trial writing is performed, and
said second optimum recording power level is determined based on an asymmetry degree of said reproduction signal obtained from said trial writing area to which said second trial writing is performed.

5. The information recording method as claimed in claim 2, wherein
said first optimum recording power level is determined based on an asymmetry degree of said reproduction signal obtained from said trial writing area to which said first trial writing is performed, and
said second optimum recording power level is determined based on an asymmetry degree of said reproduction signal obtained from said trial writing area to which said second trial writing is performed.

6. The information recording method as claimed in claim 3, wherein said second optimum recording power level is determined based on an average value of a reproduction signal corresponding to said first data stream, and an average value of a reproduction signal corresponding to said second data stream, said reproduction signals being obtained from said trial writing area to which said second trial writing step is carried out.

7. The information recording method as claimed in claim 1, wherein said specific pattern comprises recording marks of said recording information, length of which recording marks is no longer than any other marks.

8. The information recording method as claimed in claim 1, wherein said specific pattern comprises a pattern specified by a length of recording marks and one or both of a pattern immediately preceding said data stream of said recording information and a pattern immediately after said data stream of said recording information.

9. An information recording apparatus for recording information by irradiating an optical beam from a luminous source to a recording medium, and forming recording marks, said optical beam being modulated by recording information, comprising:
first trial writing means for writing first predetermined test data to a trial writing area of said recording medium, wherein recording power of said optical beam is gradually changed, and for determining a first optimum recording power level based on a reproduction signal of said first test data;
second trial writing means for writing second predetermined test data on said trial writing area of said recording medium, wherein recording power of said optical beam for recording a specific pattern is gradually changed while said recording power for patterns other than said specific pattern is set at said first optimum recording power level, and for determining a second optimum recording power level, which is the optimum recording power level for said specific pattern, based on a reproduction signal of said second test data; and
writing means for writing said recording information at said second optimum recording power level for said specific pattern and at said first optimum recording power level for patterns other than said specific pattern.

10. The information recording apparatus as claimed in claim 9, wherein said first predetermined test data comprise a data stream of said recording information, from which said specific pattern is excluded.

11. The information recording apparatus as claimed in claim 10, wherein said second predetermined test data comprise a repetition of a first data stream and a second data stream, wherein
said first data stream comprises a repetition of said specific pattern; and
said second data stream comprises a data stream of said recording information, from which data stream of said specific pattern is excluded.

12. The information recording apparatus as claimed in claim 9, wherein
said first trial writing means determine said first optimum recording power level based on one of a modulation index, and a rate of change of said modulation index of said reproduction signal obtained from said trial writing area to which said first trial writing is performed, and
said second trial writing means determine said second optimum recording power level based on an asymmetry degree of said reproduction signal obtained from said trial writing area to which said second trial writing is performed.

13. The information recording apparatus as claimed in claim 10, wherein
said first trial writing means determine said first optimum recording power level based on an asymmetry degree of said reproduction signal obtained from said trial writing area to which said first trial writing is performed, and
said second trial writing means determine said second optimum recording power level based on an asymmetry degree of said reproduction signal obtained from said trial writing area to which said second trial writing is performed.

14. The information recording apparatus as claimed in claim 11, wherein said second trial writing means determine said second optimum recording power level based on an average value of a reproduction signal corresponding to said first data stream, and an average value of a reproduction signal corresponding to said second data stream, said reproduction signals being obtained from said trial writing area to which said second trial writing means carries out writing.

15. The information recording apparatus as claimed in claim 9, wherein said specific pattern comprises recording marks of said recording information, length of which recording marks is no longer than any other marks.

16. The information recording apparatus as claimed in claim 9, wherein said specific pattern comprises a pattern specified by a length of recording marks and one or both of a pattern immediately preceding said data stream of said recording information and a pattern immediately after said data stream of said recording information.

* * * * *